United States Patent [19]

Muramoto

[11] Patent Number: 4,941,054
[45] Date of Patent: Jul. 10, 1990

[54] COLOR-DIFFERENCE LINE-SEQUENTIAL SIGNAL PROCESSING APPARATUS

[75] Inventor: Tomotaka Muramoto, Tokyo, Japan
[73] Assignee: Canon Kabushiki Kaisha, Tokyo, Japan
[21] Appl. No.: 392,091
[22] Filed: Aug. 10, 1989

Related U.S. Application Data

[63] Continuation of Ser. No. 111,456, Oct. 21, 1987, abandoned.

[30] Foreign Application Priority Data

Oct. 27, 1986 [JP] Japan ................................ 61-253698

[51] Int. Cl.$^5$ ............................................. H04N 5/76
[52] U.S. Cl. ..................................... 358/310; 358/329
[58] Field of Search ................. 358/310, 330, 329, 14, 358/16, 328

[56] References Cited

U.S. PATENT DOCUMENTS

| | | | |
|---|---|---|---|
| 4,258,384 | 3/1981 | Tatami | 358/16 |
| 4,613,909 | 9/1986 | Tobe | 358/329 |
| 4,786,978 | 11/1988 | Kawaski | 358/328 |

Primary Examiner—Donald McElheny, Jr.
Attorney, Agent, or Firm—Robin, Blecker, Daley & Driscoll

[57] ABSTRACT

A color video signal processing apparatus of the invention processes a signal with a first composite color video signal composed of at least a luminance signal and a chrominance signal converted to a second color video signal composed of at least the luminance signal and a color-difference line-sequential signal. The first composite color video signal is separated into the luminance and chrominance signals. The separated chrominance signals after having been converted to a color-difference line-sequential signal undergo signal-processing. To recover the chrominance signal from the processed color-difference line-sequential signal, it is after the latter has once been subjected to balanced modulation that the color-difference line-sequential signal is processed to the simultaneous form by making use of part of that circuit which is used to separate the first composite color video signal into the luminance and chrominance signals. The use of this feature makes it possible to achieve a simplification of the structure of construction of the circuitry and a reduction of the production cost.

17 Claims, 1 Drawing Sheet

COLOR-DIFFERENCE LINE-SEQUENTIAL SIGNAL PROCESSING APPARATUS

BACKGROUND OF THE INVENTION

1. Field of the Invention:

This invention relates to a color video signal processing apparatus in which a composite color television video signal is separated into a luminance signal and a chrominance signal, and the chrominance signal is converted into a line-sequential signal to perform recording or reproducing.

2. Description of the Related Art

In the today's standard color television system, transmission of the color video signal is effected such that two subcarriers of the same frequency (3.58 MHz) but 90° apart in phase are modulated by the respective color difference signals, and then multiplexed on the luminance signal to form a so-called quadrature two-phase-modulated simultaneous signal.

To the recording or reproducing purpose, however, with a view, among others, to allowing the television video signal to be relatively simply handled, a method of transmitting the two color difference signals alternately in each scanning line is adopted. Thus, it is after they have once been converted to a so-called line-sequential signal that the recording or reproduction is carried out.

In this case, the signal processing should include such a step that the original color television video signal is retrieved from the reproduced luminance and line-sequential color difference signals.

For example, the received line-sequential color difference signal is converted to the quadrature two-phase-modulated simultaneous signal in such a way that it is first subjected, without any further treatment, to balanced modulation by the color subcarriers of 90° different phase from each other, and then passed through a comb filter. Such a technique of recovering the simultaneous signal has recently come into use.

However, because the prior art had a mere intention of using the comb filter only for making up the above-described simultaneity, there was a problem in that the effective utilization of the comb filter could not be said to have been completely attained.

SUMMARY OF THE INVENTION

An object of the present invention is to provide a color video signal processing apparatus which can eliminate the above-described problem.

Another object is to provide a color video signal processing apparatus having a function of separating the luminance and chrominance signals out of the composite color video signal and another function of making simultaneous the color difference line-sequential signal, wherein a constituent member of the apparatus is commonly usable in performing the above-described two functions, thereby it being made possible to achieve a simplification of the structure and construction of the apparatus and a reduction of the production cost.

Under such an object, according to the present invention, in an embodiment thereof applied to a color video signal processing apparatus in which a first composite video signal composed of at least a luminance signal and a chrominance signal is converted to a second video signal composed of at least the luminance signal and a line-sequential color difference signal to carry out a signal-processing, provision is made of separating means for separating the first composite color video signal into the luminance signal and the chrominance signal, signal processing means for converting the chrominance signal separated by the separating means to the color-difference line-sequential signal and then processing the color-difference line-sequential signal, balanced-modulation means for balanced-modulating the color-difference line-sequential signal processed by the signal processing means, and supply means for supplying to the separating means the color-difference line-sequential signal balanced-modulated by the balanced modulation means.

Another object is to provide a color video signal recording and reproducing apparatus using a composite color video signal comprised of at least a luminance signal and a chrominance signal and operating in such a manner that the separated chrominance signal, after having been converted to a color-difference line-sequential signal, is recorded on a recording medium, and the recorded signal is reproduced to recover the original composite color signal, wherein some of the constituent parts are commonly usable for performing the recording and reproducing operation with an advantage that a reduction of the structure and the production cost of the apparatus can be achieved.

Under such an object, according to the invention, in an embodiment thereof applied to a color video signal recording and reproduction apparatus in which a first composite color video signal composed of at least a luminance signal and a chrominance signal is converted to a second color video signal composed of at least the luminance signal and a color-difference line-sequential signal which is then recorded on a recording medium, and the color video signal is reproduced therefrom, provision is made of separating means for separating the first composite color video signal into the luminance and chrominance signals, recording and reproducing means for converting the chrominance signal separated by the separating means to the color-difference line-sequential signal and then recording the color-difference line-sequential signal on the recording medium and for reproducing the color-difference line-sequential signal from the recording medium, balanced-modulation means for balanced-modulating the color-difference line-sequential signal reproduced by the recording and reproducing means, and supply means for supplying to the separating means the color-difference line-sequential signal balanced-modulated by the balanced-modulation means.

Other objects than those described above and the features of the invention will become apparent from the following detailed description of an embodiment thereof by reference to the drawings.

DETAILED DESCRIPTION OF THE PREFERRED EMBODIMENT

Figure 1:
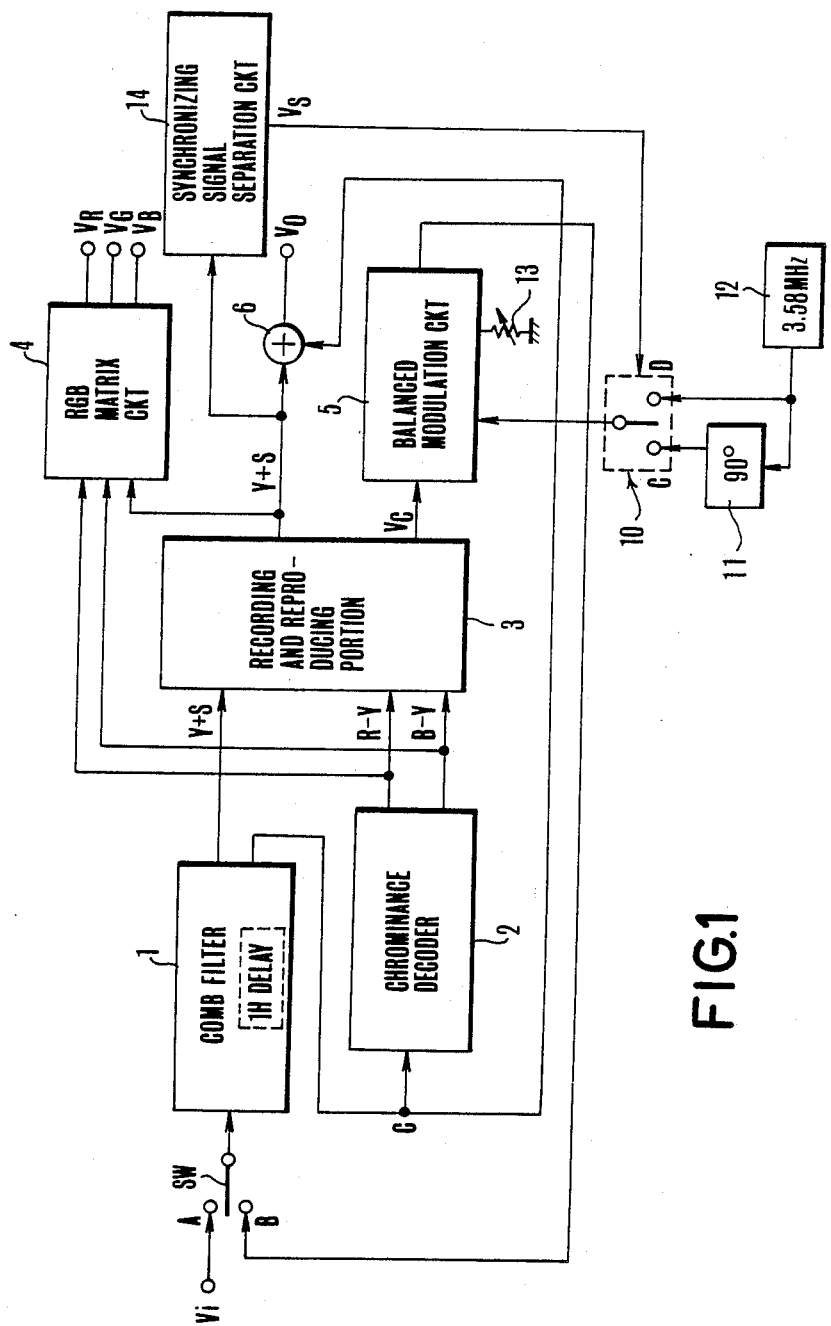
FIG. 1 is a diagram illustrating the structure of an embodiment of a circuit according to the present invention.

The present invention is described in connection with an embodiment in detail and concretely by reference to the drawing.

In FIG. 1 there is shown a practical example of the circuit of the invention comprising a comb filter 1 including a delay circuit of one horizontal scanning line period, a chrominance decoder 2, a recording and reproducing portion 3, an RGB matrix circuit 4 for producing three primary-color, or red (R), green (G) and blue (B) signals, a balanced modulation circuit 5, an adder 6, a switch SW, another switch 10, a 90° phase shifter 11, an oscillator 12, a variable resistor 13 and a synchronizing signal separation circuit 14.

The operation of such a circuit is described below.

At first, when in the record mode, the switch SW takes its "A" position to select a composite color television video signal Vi from an inlet to be applied to the comb filter 1 where it is separated into a luminance signal Y+S (with a synchronizing signal S added) and a chrominance signal C, the luminance signal Y+S being applied directly to the recording and reproducing portion 3. Meanwhile, the chrominance signal C is demodulated in passing through the chrominance decoder 2 to form two color difference signals R-Y and B-Y which are applied to the recording and reproducing portion 3.

In the case when the inputted composite color television video signal has its color difference signals simultaneous like as NTSC signal, the recording and reproducing portion 3 converts such color difference signals to the line-sequential form to be recorded on the recording medium.

Next, when in the reproduction mode, the recording and reproducing portion 3 reproduces a line-sequential color-difference signal Vc from the recording medium, which is then applied to the balanced modulation circuit 5.

It is assumed here that the phase of the subcarrier of 3.58 MHz for the balanced modulation circuit 5 is changed over between 0° and 90° in synchronism with a horizontal synchronizing signal Vs separated out of the reproduced luminance signal by the synchronizing signal separation circuit 14. For this purpose, the subcarrier from the oscillator 12 is applied both to one throw D of the switch 10 and through the phase shifter 11 to the other throw C, and the movement of the switch 10 from one throw to the other is recycled in each horizontal scanning period.

Also, the variable resistor 13 is adjusted so as to vary the hue of the chrominance signal modulated by the balanced modulation circuit 5. For example, the phase of the burst signal produced along with the modulated chrominance signal by the balanced modulation circuit 5 is varied. Conversely, the phase of the burst signal is left as it stands, but the phase of the subcarrier is varied instead. Such a hue adjustment is well known and its further explanation is omitted here.

The thus-balanced-modulated line-sequential color difference signal is applied to a chrominance signal separating circuit that the comb filter 1 contains as the switch SW is set in its "B" position when in the reproduction mode. In passing through the comb filter 1, the balanced-modulated line-sequential color difference signal is converted to a simultaneous signal in the form of the quadrature two-phase-modulated color signal C, which is supplied to the adder 6. Meanwhile, the recording and reproducing portion 3 is reproducing the luminance signal Y+S from the recording medium. The adder 6 then combines the reproduced luminance signal Y+S and the color signal C which has been obtained by the above-described process to the simultaneous form. At the output of the adder 6, therefore, the standard color television video signal Vo is produced.

Meanwhile, the output of the comb filter 1, or the quadrature two-phase-modulated color signal C, is applied also to the chrominance decoder 2, where the two color difference signals R-Y and B-Y of the base band are again demodulated. These two color difference signals R-Y and B-Y are both applied to the RGB matrix circuit 4, to which is also applied at once the luminance signal Y+S reproduced by the recording and reproducing portion 3. By computation, the matrix circuit 4 produces R, G and B signals $V_R$, $V_G$ and $V_B$.

In such a manner, when in reproduction, the color television video signal Vo and a set of the three primary-color signals $V_R$, $V_G$ and $V_B$ are outputted. Since the processes for both signals pass through the common balanced modulation circuit 5, the hue adjustment when they are balanced-modulated here makes it possible to establish exactly the same adjusted hue in both of the color television video signal and the set of RGB primary-color signals $V_R$, $V_G$ and $V_B$ at their respective outputs.

As has been described above, according to this embodiment, the comb filter as the common member is made to perform the function of separating out the chrominance and luminance signals when in the record mode, and the function of processing the color-difference line-sequential signal to the simultaneous form, thereby giving an advantage that the recording and reproduction apparatus can be constructed in a very simple form.

It is also to be understood that the present invention is not confined to such a type of recording and reproducing apparatus and is applicable to any other type of apparatus provided with a separator for luminance and chrominance signals and the simultaneous means of the color difference line-sequential signal.

It will be appreciated from the foregoing that according to the present invention, both processes for separating the chrominance signal and the luminance signal and for recovering the simultaneous signal from the color difference signal can be realized in a very simple structure.

What is claimed is:

1. A composite color video signal processing apparatus for processing a color video signal composed of a frequency-multiplexed luminance signal and chrominance signal, comprising:
   (A) separating means for receiving said composite color video signal, separating the luminance signal and the chrominance signal from the received composite color video signal and outputting these signals, said separating means including a delay circuit for applying a delay of one horizontal scanning period to the received signal;
   (B) signal processing means for receiving the chrominance signal separated by said separating means, converting the received chrominance signal into a color-difference line-sequential signal, and then processing and outputting same;
   (C) balanced modulating means for balanced-modulating the color-difference line-sequential signal outputted and processed by said signal processing means; and
   (D) supply means for supplying the color-difference line-sequential signal balanced-modulated and outputted from said balanced modulating means to the delay circuit included in said separating means.

2. An apparatus according to claim 1, wherein said separating means includes a comb filter having said delay circuit.

3. An apparatus according to claim 1, wherein said signal processing means includes:
   (a) restoring means for restoring two kinds of color-difference signal from the chrominance signal separated by said separating means; and
   (b) line-sequential forming means for converting the two kinds of color-difference signal restored by said restoring means into a line-sequential signal to form the color-difference line-sequential signal.

4. An apparatus according to claim 1, wherein said balanced modulating means is arranged to balanced-modulate the color-difference line-sequential signal processed by said signal processing means by a reference signal varying its phase in each horizontal scanning period and to output the same.

5. An apparatus according to claim 1, wherein said separating means includes a comb filter for chrominance signal separation having said delay circuit.

6. An apparatus according to claim 5, wherein said supply means is arranged to supply the color-difference line-sequential signal balanced-modulated and outputted from said balanced modulating means to the delay circuit included in said comb filter for chrominance signal separation.

7. A composite color video signal recording and reproducing apparatus for recording a composite color video signal composed of a frequency multiplexed luminance signal and chrominance signal onto a recording medium and reproducing said composite color video signal from said recording medium, comprising:
   (A) separating means for receiving said composite color video signal, separating the luminance signal and the chrominance signal from the received composite color video signal and outputting these signals, said separating means including a delay circuit for applying a delay of one horizontal scanning period to the received signal;
   (B) recording and reproducing means for receiving the luminance signal and chrominance signal separated by said separating means, converting the received chrominance signal into the color-difference line-sequential signal and then recording said signal together with the received luminance signal onto the recording medium, or reproducing the luminance signal together with the color-difference line-sequential signal recorded on said recording medium and outputting the reproduced signal;
   (C) balanced modulating means for balanced-modulating the color-difference line-sequential signal reproduced by said recording and reproducing means and outputting the same; and
   (D) supply means for supplying the color-difference line-sequential signal balanced-modulated and outputted from said balanced modulating means to the delay circuit included in said separating means.

8. An apparatus according to claim 7, wherein said separating means includes a comb filter for chrominance signal separation having said delay circuit.

9. An apparatus according to claim 8, wherein said supply means is further arranged to receive said composite color video signal and to supply the received composite color video signal to said separating means, in the case where the recording operation is being performed in said recording and reproducing means, or to supply the color-difference line-sequential signal balanced-modulated and outputted from said balanced modulating means to the delay circuit included in said comb filter for chrominance signal separation in the case where the reproducing operation is being performed in said recording and reproducing means.

10. A composite color video signal processing apparatus for processing a color video signal composed of a frequency-multiplexed luminance signal and chrominance signal comprising:
   (A) separating means for receiving said composite color video signal, separating the luminance signal and the chrominance signal from the received composite video signal and outputting these signals, said separating means including a delay circuit for applying a delay of one horizontal scanning period to the received signal;
   (B) signal processing means for receiving the chrominance signal separated by said separating means, converting the received chrominance signal into a color-difference line-sequential signal, and then processing and outputting same;
   (C) supply means for supplying the color-difference line-sequential signal outputted and processed by said signal processing means to the delay circuit included in said separating means.

11. An apparatus according to claim 10, wherein said separating means includes a comb filter having said delay circuit.

12. An apparatus according to claim 10, wherein said signal processing means includes:
   (a) restoring means for restoring two kinds of color-difference signal from the chrominance signal separated by said separating means; and
   (b) line-sequential forming means for converting the two kinds of color-difference signal restored by said restoring means into a line-sequential signal to form the color-difference line-sequential signal.

13. An apparatus according to claim 10, wherein said separating means includes a comb filter for chrominance signal separation having said delay circuit of one horizontal scanning period.

14. An apparatus according to claim 13, wherein said supply means is arranged to supply the color-difference line-sequential signal outputted and processed by said signal processing means to delay circuit included in said comb filter for chrominance signal separation.

15. A composite color video signal recording and reproducing apparatus for recording a composite color video signal composed of frequency multiplexed luminance signal and chrominance signal onto a recording medium and reproducing said composite color video signal from said recording medium, comprising:
   (A) separating means for receiving said composite color video signal, separating the luminance signal and the chrominance signal from the received composite color video signal and outputting these signals, said separating means including a delay circuit for applying a delay of one horizontal scanning period to the received signal;
   (B) recording and reproducing means for receiving the luminance signal and chrominance signal separated by said separating means, converting the received chrominance signal into the color-difference line-sequential signal and then recording said signal together with the received luminance signal onto the recording medium, or reproducing the luminance signal together with the color-difference line-sequential signal recorded on said recording medium and outputting the reproduced signal;

(C) supply means for supplying the color-difference line-sequential signal reproduced by said recording and reproducing means to the delay circuit included in said separating means.

16. An apparatus according to claim 15, wherein said separating means includes a comb filter for chrominance signal separation having said delay circuit.

17. An apparatus according to claim 16, wherein said supply means is further arranged to receive said composite color video signal and to supply the received composite color video signal to said separating means, in the case where the recording operation is being performed in said recording and reproducing means, or to supply the color-difference line-sequential signal reproduced by said recording and reproducing means to the delay circuit included in said comb filter for chrominance signal separation in the case where the reproducing operation is being performed in said recording and reproducing means.

* * * * *